Nov. 2, 1937.　　　　D. B. DREESE　　　2,097,563
CHICKEN FOUNTAIN
Filed Feb. 11, 1936

Inventor
D. B. Dreese.
By Lacey & Lacey,
Attorneys

Patented Nov. 2, 1937

2,097,563

UNITED STATES PATENT OFFICE 2,097,563

CHICKEN FOUNTAIN

Delbert B. Dreese, Larned, Kans.

Application February 11, 1936, Serial No. 63,411

1 Claim. (Cl. 119—77)

This invention relates to a poultry fountain of the type in which a container is filled with water and disposed in an inverted position over a drinking pan, and one object of the invention is to provide a device of this character wherein the glass bottle serving as a container is enclosed in a metal frame which serves not only to support the bottle at the desired height above the bottom of the pan when in position for use but also serves as a shield for the bottle and prevents it from being easily broken.

Another object of the invention is to so construct the frame or shield that it may be easily applied to a bottle of a conventional shape and when in place fits snugly about upper and lower edges of the bottle and prevent the bottle from having movement in the frame which might cause the bottle to break if carelessly handled.

The invention is illustrated in the accompanying drawing, wherein

Figure 1:
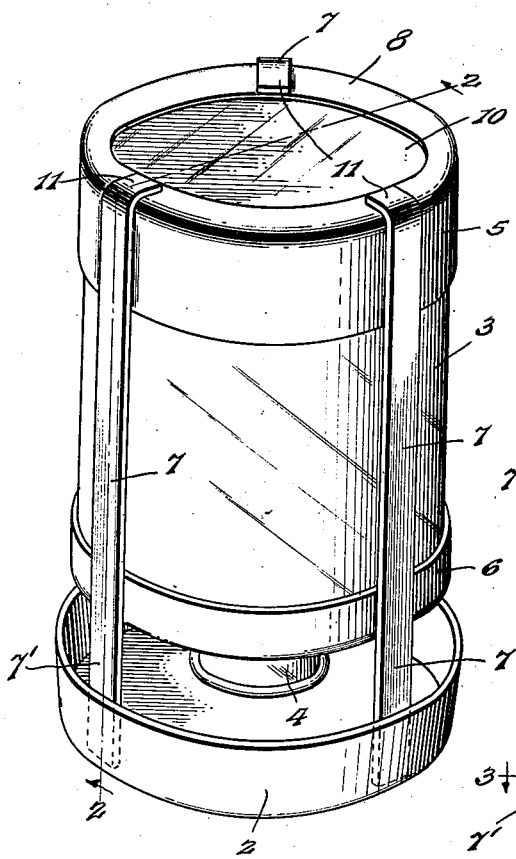
Figure 1 is a perspective view of the improved drinking fountain.
Figure 2:
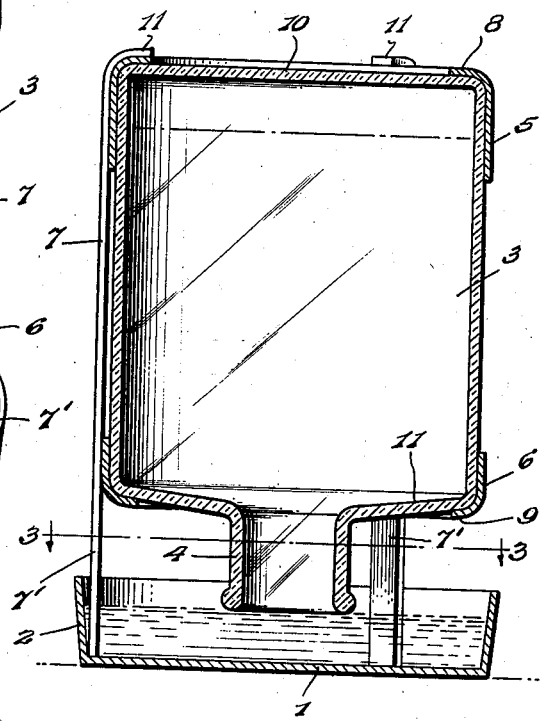
Figure 2 is a sectional view taken vertically through the fountain along the line 2—2 of Figure 1.
Figure 3:
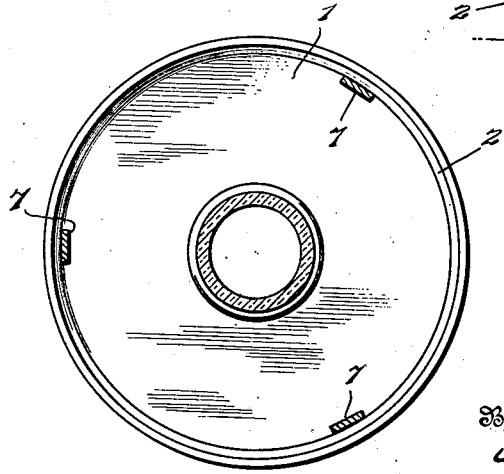
Figure 3 is a sectional view taken horizontally along the line 3—3 of Figure 2.

The drinking pan 1 may be formed of metal or any other desired material and may be of any desired dimensions. The walls 2 of the pan are of suitable depth to permit the pan to hold a sufficient supply of water for chickens or other fowl to drink easily from the pan and by referring to Figure 2 it will be seen that these walls flare upwardly. The container or water reservoir 3 consists of a bottle formed of glass or other transparent material in order that water in the bottle may be seen and the attendant thus easily determine when it is necessary to refill the bottle. This bottle is preferably of the proper size to hold a gallon of water but may be larger or smaller. The neck 4 extends from the top of the bottle centrally thereof and is of such length that when the bottle is disposed in an inverted position, this neck will extend down into the pan. In order to provide a support for the bottle, there has been provided a frame or casing consisting of rings or bands 5 and 6 and a plurality of strips 7. The bands fit snugly about the bottle or container and are bent to form flanges 8 and 9, the flange 8 of the band 5 engaging under the bottom 10 of the bottle and the flange 9 of the band 6 overlying marginal portions of the head or upper wall 11 of the bottle. It will thus be seen that the two bands fit closely about upper and lower portions of the bottle and when the strips 7, which are formed of stiff metal, are soldered or otherwise firmly secured against the bands in spaced relation to each other circumferentially thereof, the bands will be firmly held in spaced relation to each other longitudinally of the bottle and the bottle very effectively prevented from having longitudinal movement between the bands. The strips 7 project beyond the band 6 equal distances and their extended end portions 7' serve as legs or struts which rest upon the bottom of the pan and support the bottle in an inverted position with the neck terminating intermediate the depth of the pan. Therefore, when the bottle is supported in an inverted position over the pan, water may flow through the neck 4 until the pan is filled to such a depth that the water reaches the neck of the bottle and forms a seal which will prevent additional water flowing from the bottle. As water in the pan is consumed or evaporates, additional water will flow from the bottle and thus a supply of water will be maintained in the pan as long as there is water in the bottle. When the attendant notices that water in the bottle is reduced to such an extent that it is almost exhausted, the bottle is lifted from the pan and turned to an upright position in which it can be refilled. The metal casing formed by the bands 5 and 6 and strips 7 will serve very effectively as a shield to prevent accidental breaking of the bottle and, if so desired, the extended end portions of the strip 7 may be grasped and the bottle thus easily lifted and carried from one place to another. It should also be noted that when the bottle is in its upright position, the extended end portions of the strip 7 may serve as means for supporting a funnel having its spout thrust into the neck of the bottle during a filling operation. Attention is further called to the fact that the diameter of the pan is such that when the bottle is disposed in an inverted position over the pan, the extended end portions of the strip 7 which serve as legs will rest upon the bottom of the pan at the lower edge 2 and, therefore, the bottle will be retained in centered relation to the pan. As the walls of the pan flare upwardly, the ends of the legs may make contact with the inner face of the annular wall as they move downwardly in the pan and they will thus be guided into their proper positions upon the bottom of the pan.

The bent ends 11 of the strips 7 serve to more firmly anchor the strips and also reinforce the flange 8 and prevent wear when the bottle is set in an upright position. If so desired, the flange 8 may be omitted and the bent ends 11 of the strips depended upon to engage the bottom of the bottle and prevent longitudinal shifting of the bottle.

Having thus described the invention, what is claimed as new is:

In a drinking fountain, a bottle serving as a water container and having a neck, and a casing about the bottle consisting of bands fitting snugly about upper and lower portions of the bottle, the lower band having a portion extending below the bottle and bent to form a flange engaged under the bottom of the bottle in flat contacting engagement therewith, the upper band having a portion extending above the bottle and bent to form a flange overlying the top of the bottle in flat contacting engagement therewith and strips extending longitudinally of the bottle in spaced relation to each other circumferentially thereof and firmly secured against outer surfaces of the bands to retain the bands in close fitting engagement with the bottle, said strips having their upper end portions projecting beyond the upper band and constituting legs adapted to support the bottle when inverted in an elevated position over a water pan with the neck of the bottle extending downwardly into the pan and terminating in spaced relation to the bottom of the pan, lower end portions of said strips being bent inwardly and secured across the under face of the flange of the lower band.

DELBERT B. DREESE.